United States Patent
Galdeano et al.

(10) Patent No.: US 8,951,457 B2
(45) Date of Patent: Feb. 10, 2015

(54) PARTITIONED SHELL MOLD FOR WIND TURBINE BLADES, ITS MANUFACTURING METHOD, AND BLADE PRODUCTION METHOD EMPLOYING THIS MOLD

(75) Inventors: Jorge Lana Galdeano, Imarcoain (ES); Alejandro Saez Moreno, Sarriguren (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 97 days.

(21) Appl. No.: 13/331,244

(22) Filed: Dec. 20, 2011

(65) Prior Publication Data

US 2012/0175807 A1 Jul. 12, 2012

(30) Foreign Application Priority Data

Dec. 23, 2010 (ES) .................................. 201001607

(51) Int. Cl.
```
B29C 33/38      (2006.01)
B29C 33/02      (2006.01)
B29C 33/30      (2006.01)
F03D 1/06       (2006.01)
B29C 33/04      (2006.01)
B29C 33/26      (2006.01)
B29L 31/08      (2006.01)
```

(52) U.S. Cl.
CPC ............. *B29C 33/307* (2013.01); *B29C 33/306* (2013.01); *F03D 1/0675* (2013.01); *B29C 33/046* (2013.01); *B29C 33/26* (2013.01); *B29C 33/38* (2013.01); *F05B 2230/30* (2013.01); *F05B 2280/6003* (2013.01); *Y02E 10/721* (2013.01); *B29L 2031/085* (2013.01)
USPC .......................................... 264/219; 425/179

(58) Field of Classification Search
USPC ........................................... 264/219, 226, 227
See application file for complete search history.

(56) References Cited

U.S. PATENT DOCUMENTS

| | | | | | |
|---|---|---|---|---|---|
| 2,274,060 | A | * | 2/1942 | Hart | 264/219 |
| 2,420,443 | A | * | 5/1947 | Rempel | 156/287 |
| 2,664,593 | A | * | 1/1954 | Larson | 425/195 |
| 3,161,555 | A | * | 12/1964 | Kish | 156/245 |
| 3,171,163 | A | * | 3/1965 | Ford et al. | 425/390 |
| 3,282,761 | A | * | 11/1966 | Evangelist | 156/249 |
| 4,073,049 | A | * | 2/1978 | Lint | 29/458 |
| 4,448,628 | A | * | 5/1984 | Stott | 156/425 |

(Continued)

FOREIGN PATENT DOCUMENTS

| | | |
|---|---|---|
| ES | 2 208 028 | 6/2004 |
| WO | 2009/156061 A2 | 12/2009 |

OTHER PUBLICATIONS

Machine translation of abstract of ES 2 208 028.

*Primary Examiner* — Matthew Daniels
(74) *Attorney, Agent, or Firm* — Ladas & Parry LLP

(57) ABSTRACT

The invention describes a mold for non-metallic wind turbine blade shells that comprises two semi-molds, upper and lower, hinged with a pivoting system and equipped with stiffening ribs that hold a system of air conduits on it, and which is partitioned transversely in at least two parts (1A, 2A) and (1B, 2B) that are joined together with some fastening ribs (13A, 13A', 13B, 13B'). The invention likewise describes the manufacturing method for this mold and the method to obtain a wind turbine blade by replacing an already constituted part of the mold to obtain a geometry differentiated from the original in one of its parts, and to manufacture another family of wind turbine blades.

4 Claims, 5 Drawing Sheets

(56) References Cited

U.S. PATENT DOCUMENTS

| | | | |
|---|---|---|---|
| 4,545,102 A * | 10/1985 | Grabos | 29/407.05 |
| 5,022,845 A * | 6/1991 | Charlson et al. | 425/403 |
| 5,223,067 A * | 6/1993 | Hamamoto et al. | 156/173 |
| 5,773,047 A * | 6/1998 | Cloud | 425/403 |
| 7,223,091 B2 * | 5/2007 | Olsen et al. | 425/450.1 |
| 7,374,708 B2 * | 5/2008 | Pellicer | 264/227 |
| 8,479,552 B1 * | 7/2013 | Dykstra | 72/342.7 |
| 2002/0028310 A1 * | 3/2002 | Haraldsson et al. | 428/36.1 |
| 2003/0091679 A1 * | 5/2003 | Aramburu et al. | 425/384 |
| 2008/0277834 A1 * | 11/2008 | Schibsbye | 264/334 |
| 2011/0073237 A1 * | 3/2011 | Rajasingam | 156/60 |

\* cited by examiner

PARTITIONED SHELL MOLD FOR WIND TURBINE BLADES, ITS MANUFACTURING METHOD, AND BLADE PRODUCTION METHOD EMPLOYING THIS MOLD

OBJECT OF THE INVENTION

The present invention is related with the manufacturing of molds for their subsequent use in production of composite material wind turbine blades and, specifically, with a manufacturing method for a modular blade mold for producing blades differing in dimension. The invention likewise describes the mold obtained with this manufacturing method and the blade molding method employed with the mold.

BACKGROUND OF THE INVENTION

There is a current tendency to manufacture new models of wind turbines capable of generating more power, which thus tends to increase the dimensions of their rotors by the enlarging of their blades.

As known in the state of the art, wind turbine blades comprise a beam with a longitudinal extension, which represents the structural element of the blade, covered with an external skin known as shells, an upper and lower, manufactured using molds known as shell molds.

These shell molds are primarily made of composite fiber materials and resins, with certain metal structural and are utilized to shape the piece, cure materials in the blade and assemble them to obtain the final product, i.e., the wind turbine blade.

Manufacturing was traditionally carried out in two parts, upper and lower, that correspond with the two external skins of the blade. In other words, two semi-molds that are set up to form a single piece based on the geometry of the blade intended to be obtained from the base model.

Shell semi-molds are large-dimensioned elements that are generally rectangular in form and interconnected with some actuators that work as hinges, hence opening and closing the shells. Fabrics of composite material are laid on each of the semi-molds to conform, on each one, with a part of the blade. To do so, once the fabrics have been laid, the mold is closed thereby initiating curing or heating of the mold, positioning the part of the mold corresponding to the hub together with the air injection system and, consequently, the part corresponding to the blade tip towards the free part of the mold.

An example of the shell mold is described in Spanish patent ES2208028, which is primarily formed by non-metallic materials, a composite material bed, a metal structure and composite sandwich panels that provide support to the bed and serve for air conduction, a mechanical system that moves one of the two semi-molds for carrying out opening and closing operations, and a heating system that allows the mold to function as an oven. The system is in turn equipped with is self-supporting structural air conduits forming the sandwich panels and are supported longitudinally by some metal ribs. The mold structure affords a certain degree of liberty vis-à-vis the driving system, by sliders located in the metal ribs and joined together when opening or closing so as to enable expansion without undergoing stress while it undergoes heating.

The aforementioned increase in rotor dimensions and the ensuing lengthening of blades result in the need to produce a shell mold for each new blade geometry intended for production. This implies substantial manufacturing costs, not only for the cost of the mold itself, but also for the time elapsed for the full process.

Solutions known in the State of the art suggesting the production of blades by parts, such as the one described in international patent WO2009/156061, in order to standardize the blade production process. To do so, a method is employed according to which the different parts of the blade are manufactured independently and subsequently joined together using an integration device. However, this solution focuses on the production of a standard blade and calls for, if production of blades differing in geometry from the standard blades is required, an integration device for this specific blade geometry. Further, the method described therein could generate difficulties in obtaining a quality final product, since it could present irregularities or weak points at the surfaces of the joint areas for the different parts of the blades, which will thus condition their behavior.

DESCRIPTION OF THE INVENTION

Blades, as a general rule, present a common geometrical area that usually corresponds with the area of the blade root, and a geometrical area that differs, as regards dimensions, corresponding to the blade tip.

The object of the invention is the production of a new partitioned shell mold that permits the manufacturing of different wind turbine blade models having a common aerodynamic surface.

A first object of the invention is the manufacturing of a blade mold based on a blade model that is likewise partitioned.

According to the invention, for partitioned mold production, the blade model to manufacture is separated in two differentiated parts, comprising a common part for different wind turbine blade models, and an "uncommon" or particular part. This model has an intermediate area that acts as a tool for positioning auxiliary manufacturing tools of the semi-molds.

A second object of the invention is to provide a system for alignment and reference between the different parts of the blade model and mold so that the different parts can be united, obtaining a shell mold that allows wind turbine blade production in a single piece.

The invention intends to place, on the intermediate tool of the model, certain tools that mark the end of each of the section in which the model is partitioned. These tools are positioned by a coordinate measuring machine, referencing them to the model, and serve as a reference for laminating the mold bed.

Once the mold bed has been produced, it is positioned on some ribs joining the different parts of the mold. To do so, some rib positioning tools are set on the intermediate tool of the model using a coordinate measuring machine.

These joint ribs, metal with mechanized parts, serve for the mechanical union of the different parts of the mold, the final semi-molds constituting this union.

This process is carried out on the two final parts of the semi-molds to be joined together, the referenced mechanized parts remaining on the joint ribs to be subsequently joined one with the other mechanically, thus forming a semi-mold.

A third object of the invention is a method of replacing a part of the mold that has already been formed with a view to obtaining a geometry differing from the original in one of its parts, thus enabling the production of another family of wind turbine blades.

To change the desired end of the mold, the mechanized elements of the joint ribs are first uncoupled, the bed union area is cut and then the new end of the mold is assembled in a similar manner.

With the system, object of the invention, the mold can be partitioned in two, three or more areas, as desired. Further, any of these can be changed whereby obtaining a different blade model but with a part in its geometry in common with other blades.

These and other aspects of the invention shall be described in further detail with the aid of drawings, which are described below.

DESCRIPTION OF A PREFERENTIAL EMBODIMENT

Figure 1:
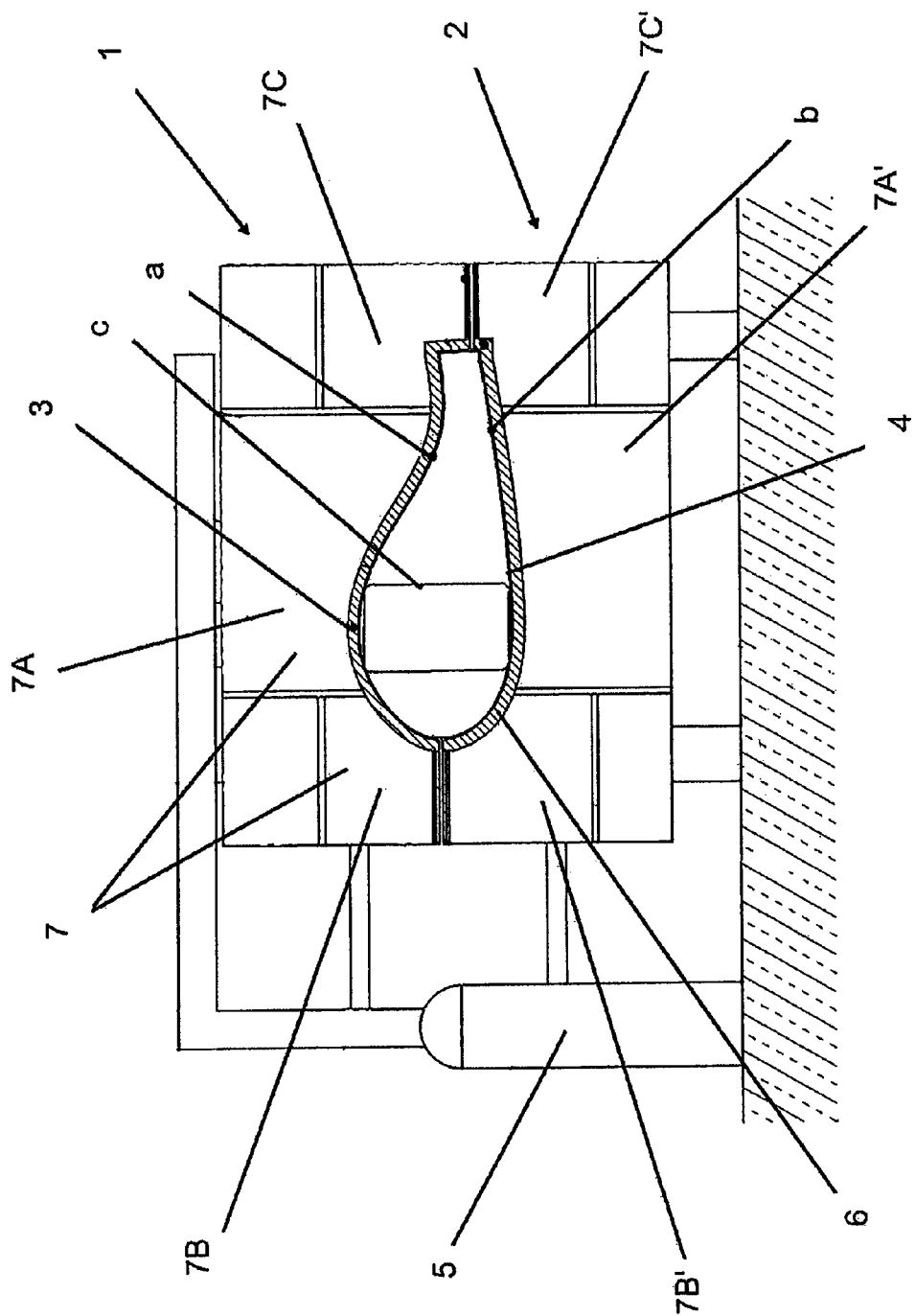
FIG. 1 is a profile view of the inside of a conventional shell mold.

FIG. 1 shows a conventional blade shell mold comprising two semi-molds (1 and 2), upper and lower, made of two composite material pieces, preferably fiberglass and epoxy resin, forming the aerodynamic profile of the blade.

On the one hand, the upper bed (3) is immersed in the upper semi-mold (1) and, on the other hand, the lower bed (4) is immersed in the lower semi-mold (2), which rests on the floor in a set position and supports the weight of both the upper bed (3) and the blade unit formed by the stiffening beam (c) and the blade shells (a and b). The pivoting mechanism (5) is the mechanical system is responsible for enabling the upper semi-mold (1) to reach the open and closed positions necessary for manufacturing the blades.

The upper (3) and lower (4) beds are formed by a thermal chamber along the entire mold (1 and 2) made of a sandwich comprising two skins of fiberglass and epoxy, and an intermediate honeycomb-panel body with an aluminum core (6).

To introduce hot air inside the bed (3 or 4) and extract it a lesser temperature, there are a series of conduits (7) distributing air evenly inside the bed. The impulsion of hot air is made by an upper central conduit (7A) and by a lower central conduit (7A'), and its entrance in the bed (3 and 4) is made through holes drilled in the second skin. Some lower lateral conduits (7B', 7C'), and upper lateral conduits (7B, 7C) collect the air that has already heated the bed (3 and 4). These conduits (7) comprise sandwich panels with a core of insulating foam.

Air conduits (7) must be positioned once the mold bed (3, 4) has been manufactured by lamination of the composite material and are secured with ribs (not represented) connected to the pivoting system (5) by sliders.

For the blade manufacturing process, cold lamination of the composite material is first carried out, followed by heating once the mold has been closed. This is thus followed by the curing of blade shells (a and b) and adhesive joining the shells with the beam (c), as well as the shells (a and b) through the sides of the shell.

As mentioned above, the production of a mold is based on a scale model of the desired final product. Therefore, in order to obtain partitioned molds, the bed must first be manufactured on partitioned models.

Figure 2:
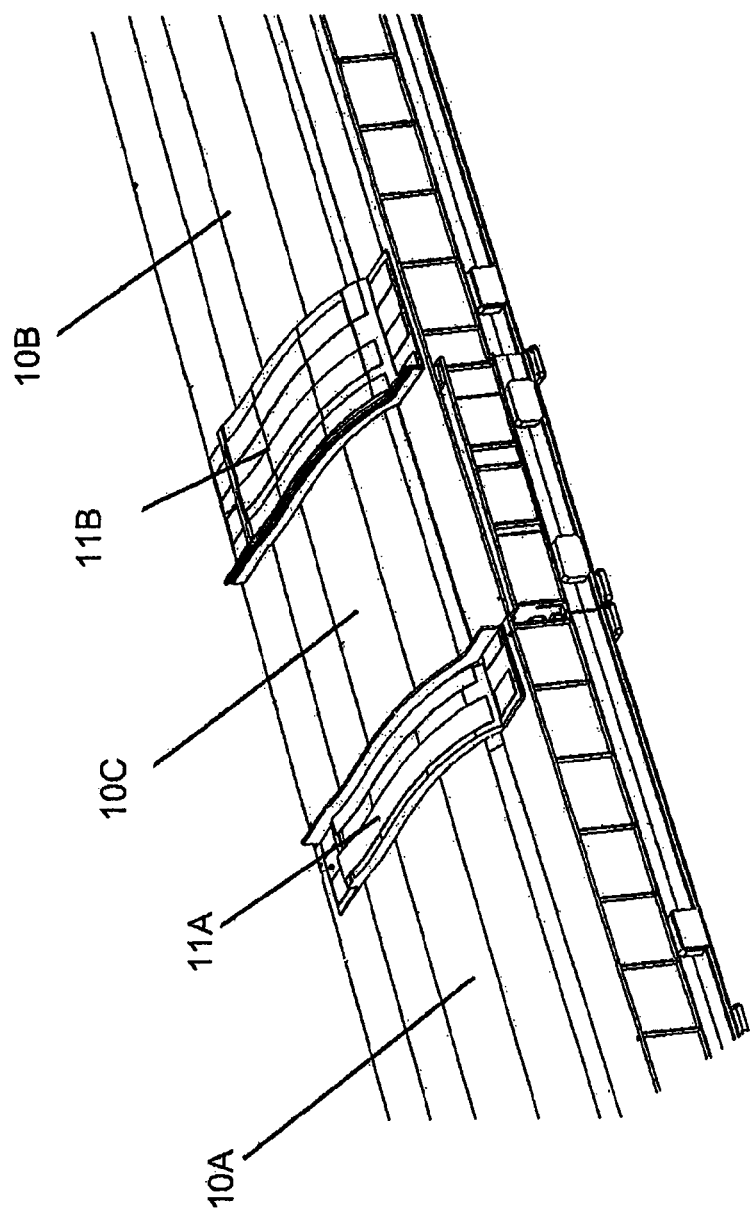
FIG. 2 is a perspective of the models of a blade shell and the model tool according to the invention.

FIG. 2 shows some parts of a model (10A, 10B) in correspondence with one of the aerodynamic profiles of a wind turbine blade, i.e., the upper shell of the blade and, inter alias, a tool for the model (10C), which is used for support and to reference for some auxiliary tools (11A, 11B). The auxiliary tools determine some tabs at their ends which serve as a reference when finishing the mold bed, procuring a vertical bed that coincides with the end of the other part. In other words, the final end of the part of the model (10A) corresponds with the beginning of the part of the model (10B) in the aerodynamic profile of the blade.

Figure 3:
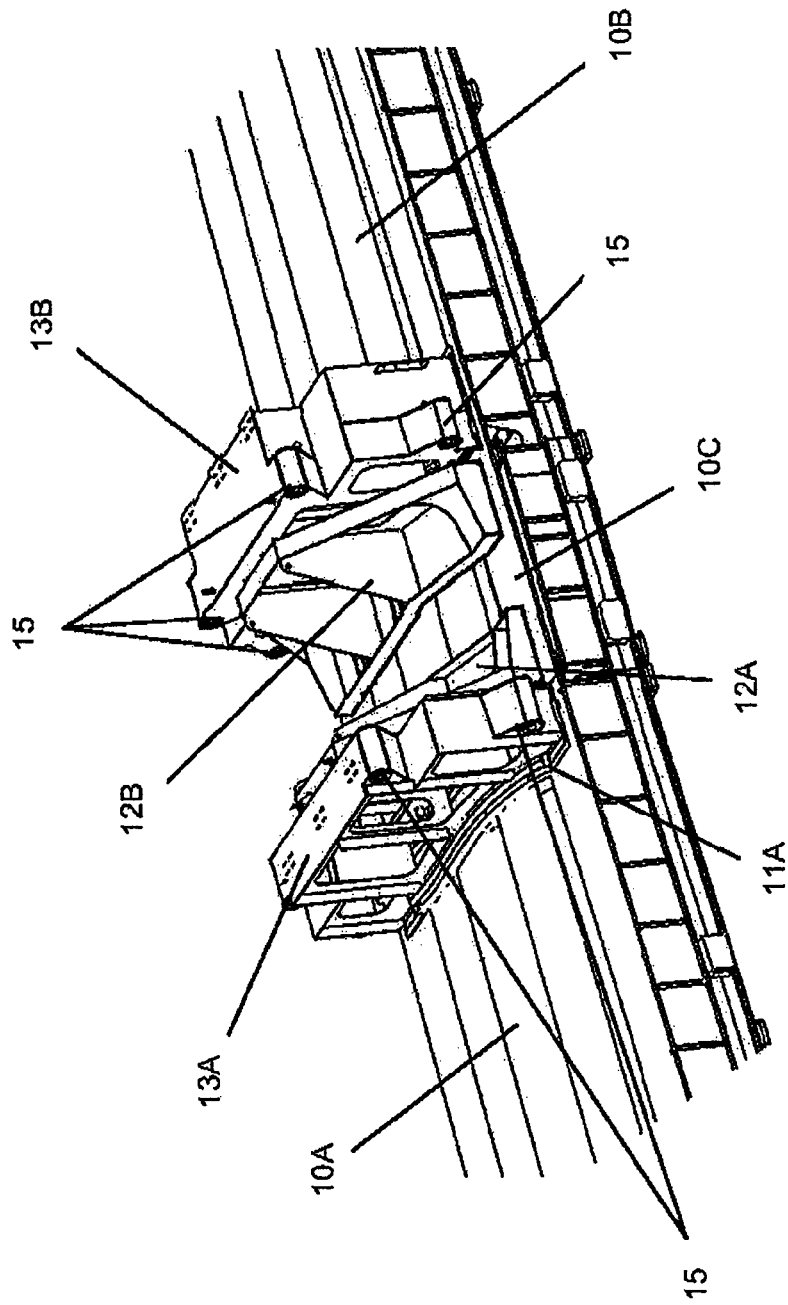
FIG. 3 shows a perspective of the models with the rib positioning tools and the joint ribs for the molds.

The parts of the models (10A, 10B) can be seen joined together in FIG. 3 with the tool of the model (10C), and the latter supports some tools (12A, 12B) for positioning the joint ribs (13A, 13B). These positioning tools (12A, 12B) are mounted in some exact spots on the tool for the model (10C) and are secured to it.

The joint ribs (13A, 13B) are then fastened to each one of the tools (12A, 12B), which, given their configuration, permit a certain adjustment for fitting the joint ribs (13A, 13B), using a coordinate measuring machine, in their exact position with respect to the models (10A, 10B).

Having found the exact spot at which the ribs (13A, 13B) must be mounted, the entire unit is removed, ribs (13A, 13B) and positioning tools (12A, 12B), and the part lining up with the bed (3) is impregnated with structural adhesive, subsequently remounting the ribs (13A, 13B) and fastening them to the bed (3), then applying a lamination of fiberglass and epoxy.

Finally, the rest of the mold elements are mounted: normal mold ribs, sandwich panels for the conduits and remaining auxiliary elements; followed by production.

Figure 4:
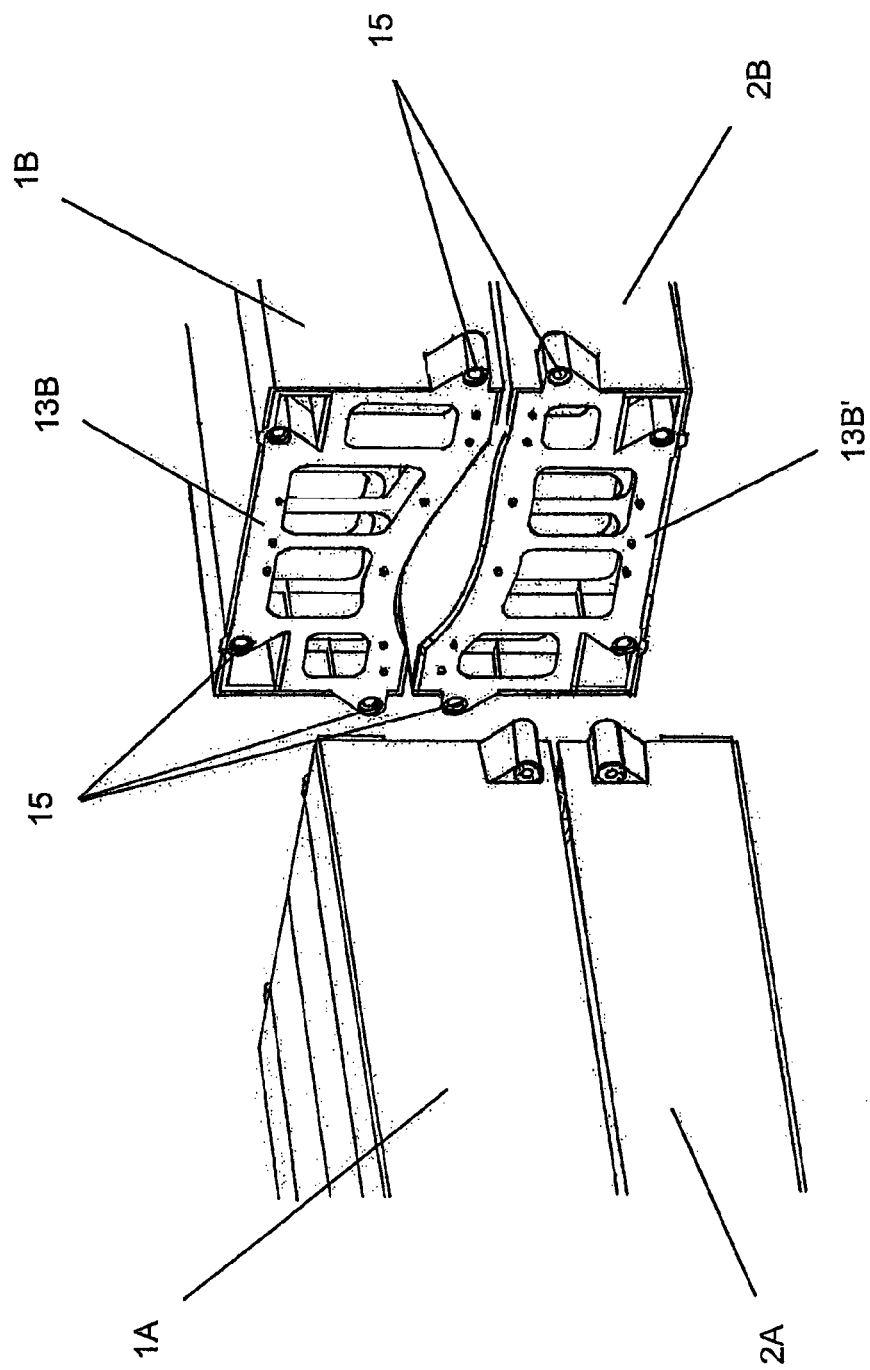
FIG. 4 shows a perspective of one of the two halves of a partitioned mold according to the invention.

Having produced the mold, it is then joined. FIG. 4 represents the semi-molds of a lower end (2A) and upper end (1A) mounted at their ideal reference facing each other, mirroring the other end of the semi-mold (1B, 2B), which determine the joint ribs at their ends (13A, 13A', 13B, 13B').

The ribs (13A, 13A', 13B, 13B') determine at least one element (15) for mechanical centering, alignment and fastening per semi-mold and end corresponding with the centering elements of the semi-mold on the other end, resulting in a single semi-mold once fastened together.

Figure 5:
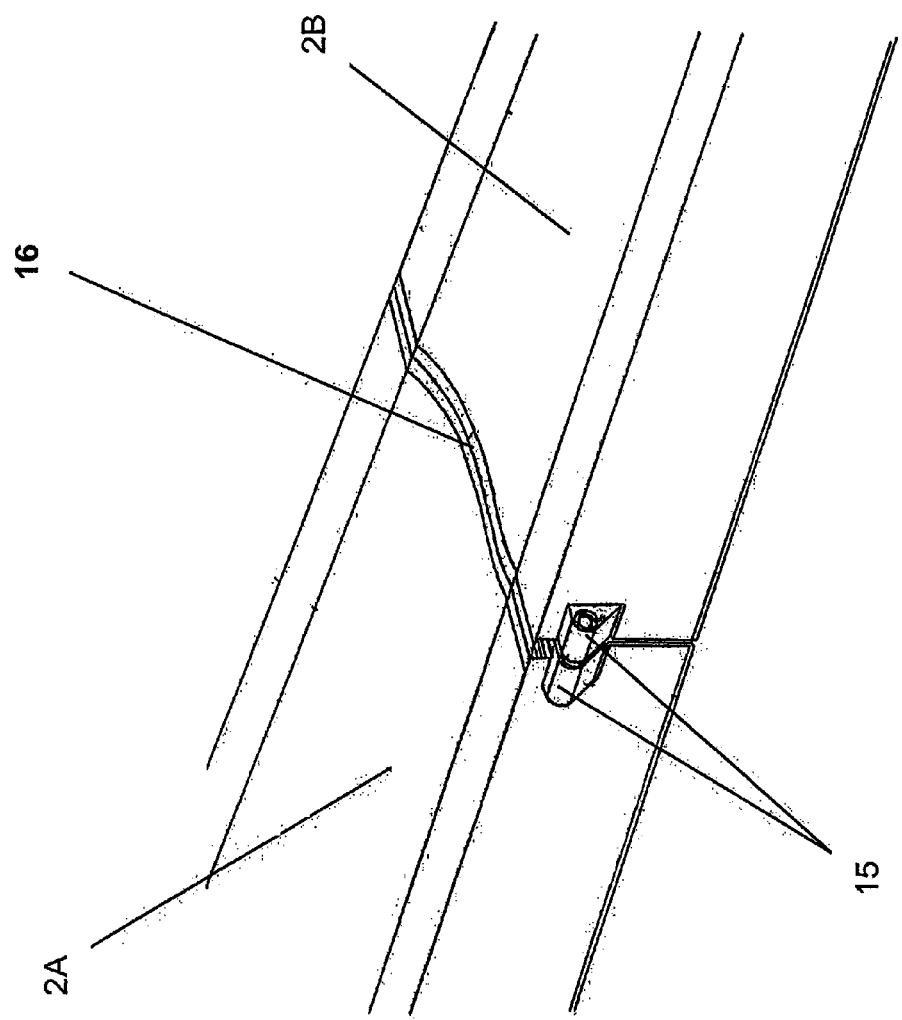
FIG. 5 shows a perspective of two lower semi-molds joined according to the invention.

FIG. 5 shows a semi-mold (2A, 2B) comprising two ends joined together, with the centering elements (15) aligned and each of their ends secured to the other end.

The semi-mold (2A, 2B) incorporates a lamination band (16) on the union necessary for joining the beds (4A, 4B) by the part that copies the form of the blade, and this band (16) is made of the same materials as the bed (4A, 4B). It also incorporates a sealing of the parts of the conduits with lamination in order to preclude air leaks.

Although the present invention has been described entirely in connection with the preferential embodiments, it is nevertheless obvious that modifications can be introduced within its scope, and should not be construed as a limit to the previous embodiments, rather to the content of the following claims.

The invention claimed is:

1. A method of manufacturing a wind turbine blade shell mold that is partitioned transversely in at least two mold parts, wherein first and second of the at least two mold parts are joined together at respective ends thereof by a plurality of joint ribs, wherein the mold is formed primarily by non-metallic materials and comprises upper and lower semi-molds hinged by a pivoting system and equipped with stiffening ribs that secure an air conduit system thereto, wherein manufacture of the mold comprises determining a desired alignment of the plurality of joint ribs at the respective ends of the at least two mold parts by steps comprising:

(a) providing a partitioned model comprising a first model part and a second model part joined together by a model tool part disposed between the first and second model parts and forming respective first and second beds of the first and second mold parts on the respective first and second model parts;

(b) resting a first of the plurality of joint ribs on the first bed on an end of the first model part and a second of the plurality of joint ribs on the second bed on an end of the second model part and positioning the first and second joint ribs on the first and second beds on the respective ends of the first and second model parts with positioning tools so that the first and second joint ribs are in the desired alignment with respect to each other on the partitioned model;

(c) securing the first and second joint ribs to the respective first and second beds of the first and second mold parts so that respective ends of the first and second mold parts can be joined together with the first and second joint ribs in the desired alignment and mounting a remainder of the first and second mold parts to the respective beds and the first and second joint ribs to complete formation of the first and second mold parts; and (d) removing the first and second mold parts from the first and second models and joining the first and second mold parts together by assembling the first and second joint ribs in said alignment.

2. The method of claim 1, wherein the positioning tools comprise a coordinate measuring machine.

3. The method of claim 1, wherein the positioning tools are disposed on the model tool part during the positioning in step (b).

4. A method for manufacturing a mold for use in forming a wind turbine blade, wherein the mold comprises first and second mold parts comprising respective first and second joint ribs and respective first and second mold beds, the first and second mold parts being joined together at respective ends thereof with the first and second joint ribs in alignment at the respective ends, the method comprising the steps of:

(a) providing a first model part having a profile of a first upper shell portion of the wind turbine blade, a second model part having a profile of a second upper shell portion of the wind turbine blade and a model tool part comprising positioning tools disposed between the first and second model parts, (b) forming the first and second mold parts on the first and second model parts with the first mold bed conforming to the profile of the first model part and the second mold bed conforming to the profile of the second model part and with the first and second joint ribs disposed in a relative disposition ascertained by positioning the first and second joint ribs on the first and second mold beds respectively with the positioning tools to ascertain a relative disposition of the respective first and second joint ribs that can achieve said alignment; and (c) removing the first and second mold parts from the first and second model parts and joining the first and second mold parts together by assembling the first and second joint ribs in said alignment.

\* \* \* \* \*